Sept. 30, 1969  R. KOPPE  3,469,624
COOLING SYSTEM FOR THE SHELL OF A REACTOR
Filed Oct. 19, 1967  2 Sheets-Sheet 1
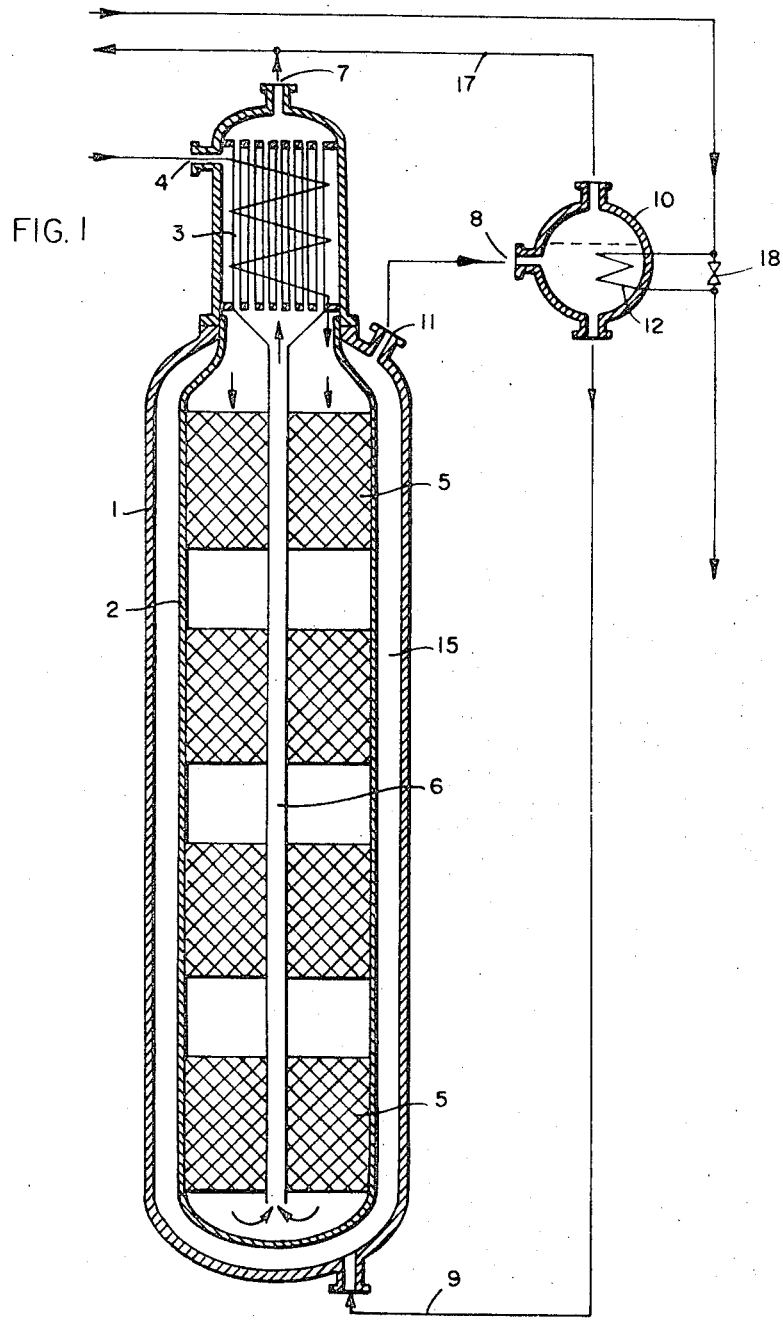
INVENTOR:
ROLF KOPPE
BY
Marzall, Johnston, Cook & Root
ATT'YS

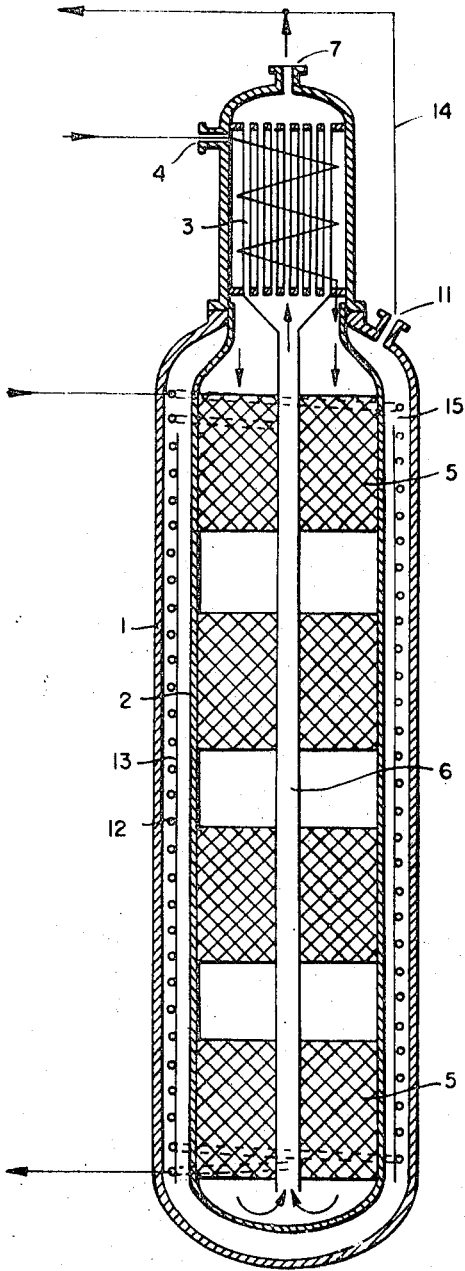

3,469,624
Patented Sept. 30, 1969

3,469,624
COOLING SYSTEM FOR THE SHELL
OF A REACTOR
Rolf Koppe, Ludwigshafen (Rhine), Germany, assignor to
Badische Anilin- & Soda-Fabrik Aktiengesellschaft,
Ludwigshafen (Rhine), Germany
Filed Oct. 19, 1967, Ser. No. 676,593
Claims priority, application Germany, Oct. 20, 1966,
B 89,459
Int. Cl. F28d 15/00; F28f 3/12; B01j 9/00
U.S. Cl. 165—105                                   2 Claims

ABSTRACT OF THE DISCLOSURE

A cooling system for the shell of a large high-pressure reactor containing a catalyst vessel, wherein for the purpose of reducing stress on the wall of the catalyst vessel the space between this wall and the shell of the reactor is partly or completely filled with indirectly cooled water and in communication through pipe means with the interior of the catalyst vessel for equalizing the pressures.

The invention relates generally to a cooling system for a reactor and more particularly to a cooling system for the external shell of a high-pressure reactor containing a catalyst vessel.

For economical as well as technological reasons modern developments in the field of high pressure syntheses favor the construction of larger and larger reactors. Reactors having diameters between 3 and 4 meters and lengths exceeding 20 meters are now quite common.

One design of reactor which is widely used comprises a pressure-resistant shell and a built-in vessel for the catalyst.

The working temperature inside the catalyst vessel is generally between 450 and 550° C. These high temperatures must be prevented from affecting the pressure-resistant shell and reducing its mechanical strength. In conventional designs this is done by thermally insulating either the interior or exterior of the catalyst vessel and by conducting the cold synthesis gas entering the reactor through the space between the catalyst vessel and the pressure-resistant shell and thereby cooling the shell.

Smaller reactor units having diameters of up to about 1.5 meters are provided with a removable cover. The catalyst vessel can therefore be removed from and reinserted into the shell. Removal of the catalyst vessel is usually effected for the purpose of subjecting the vessel to a water pressure test.

Larger reactors are not provided with such a removable cover because of the structural difficulties and high cost involved. In these large units the catalyst vessel is therefore inserted into the reactor before the final annular weld seam is made and thereafter remains permanently inside the reactor. The fact that in such a case the catalyst vessel must remain inside the reactor even when it is desired to submit the vessel to a water pressure test has one major drawback: the thermal insulating material which usually consists of organic or mineral substances is soaked with water and either disintegrates or is destroyed or damaged by the evolution of steam during the subsequent drying process.

This is not the only drawback which an increase in capacity of the reactor entails. The pressure of the synthesis gas falls as the gas passes through the reactor. In view of the design of the reactor the pressure of the entering gas which flows through the space intervening between the catalyst vessel and the external shell is, at any point of its path, in excess of the pressure of the gas at any subsequent point of its path. Since this also includes the path taken by the gas through the interior of the catalyst vessel the highest pressure differential is that existing between the pressure in the space between catalyst vessel and shell and the internal pressure at the outlet end of the catalyst vessel. Owing to this pressure differential the catalyst vessel is compressively stressed by a pressure acting upon it from the outside. The wall thickness which is necessary for withstanding such pressures can be determined only by very complex calculations. In the case of reactors of smaller diameter this fact is taken into account by making certain allowances when designing the wall, but the total wall thicknesses thus obtained are not exceptionally large.

In the case of reactors having a diameter of 3 meters and more, the absence of a reliable method of calculation creates an unacceptable situation since arbitrarily chosen wall thicknesses for the catalyst vessel lead to dimensions which are economically prohibitive.

For overcoming this difficulty it has been proposed to change the path of the gas through the reactor in such a way that the catalyst vessel is stressed by internal pressure. Although this step permits the wall thickness of the catalyst container to be calculated, the design of the gas path introduces fresh difficulties.

It is an object of this invention to develop a design in which the thermal stress on the external shell of a high-pressure reactor is reduced.

Another object of the invention is at the same time to reduce the external pressure load on the wall of the catalyst vessel.

Yet another object of the invention is the development of a strong light-weight reactor which is economical to construct.

Finally it is an object of the invention to provide a cooling system for a reactor containing a catalyst vessel in its interior.

These and other objects are achieved according to the invention by at least partly filling the space between the wall of the catalyst vessel and the external shell of the reactor with cooled water and connecting the said space by pipe means to the interior of the catalyst vessel for the purpose of equalizing the pressures.

In order to reduce the stresses which arise in the shell of the reactor the space between the wall of the catalyst vessel and the shell of the reactor is partly filled with cooled water, its upper end being connected by pipe means with the interior of the catalyst vessel and the space itself divided by a vertical cylindrical partition into two annular chambers, the water-filled portion of the intervening space being provided with cooling means.

If the water is to be cooled outside the reactor the space between the wall of the catalyst vessel and the shell of the reactor is completely filled with water. For the purpose of pressure equalization outside the reactor there are provided a collection vessel, a pipe line between said space and the collection vessel, a second pip line between the top of the collection vessel and the interior of the catalyst vessel, a third pipe line between the bottom of the collection vessel and the bottom end of said space as well as cooling means in the collection vessel.

These arrangements ensure that the wall of the catalyst vessel will not be stressed at all when the flow of gas through the reactor is stopped.

When the gas flows through the reactor the pressure inside the catalyst vessel is higher at the inlet end than at the exit end. In order to ensure that the pressure inside the catalyst vessel is always higher than the pressure outside the vessel it is proposed—in order to connect the space between the shell and the catalyst vessel, when this space is completely filled with water, with the interior of the catalyst vessel—to provide a pipe leading from said space to a collection vessel, a second pipe between the top of the collection vessel and the interior of the catalyst vessel, a third pipe connecting the bottom of the collection vessel to the bottom end of said space, and cooling means in the collection vessel.

In the proposed arrangement the shell is kept cool by water instead of by the provision of thermal insulating material on or in the catalyst vessel and by the cooling effect of the gas flowing through the space between the catalyst vessel and the external shell.

This means that that portion of the heat passing through the wall of the catalyst vessel which would excessively heat the shell must be carried away by the water. The water circulates by natural convection, the heat taken up by the water being removed in a heat exchanger outside the reactor. The heat may also be removed by the provision of an arrangement in which the space between the shell and the container is only partly filled with water and the water-filled part of the space is provided with cooling means, the upper end of the space being connected by pipes with the interior of the contact vessel and divided by a vertical cylindrical partition into two annular chambers. In order to ensure that the water remains in the liquid state so that natural circulation is maintained, the temperature of the water which is under synthesis gas pressure must not exceed its saturation temperature at this pressure.

One known method avails itself of pressurized water for abstracting the heat of reaction between the catalyst beds. In such an arrangement the temperature distribution in the catalyst bed must be adapted to reaction kinetic conditions and the reaction must be controlled to proceed optimally.

In another known arrangement in which an upwardly open insertion is built into the reactor an inert liquid substance is used for flushing the space between the shell of the reaction vessel and the insertion to prevent the shell of the reaction vessel from being corroded by highly corrosive reaction products.

In contrast to this the arrangement according to this invention serves to cool the pressure-resistant shell of the reactor.

The proposed cooling system has further advantages in addition to those mentioned above. In view of being cooled with water the pressure-resistant shell is not in contact with the synthesis gas. Expensive steels which are resistant to pressurized hydrogen are not therefore required for the shell and the construction of the reactor is cheaper. Moreover, when the synthesis gas is used for cooling, there is always a risk of the shell being overheated when the machine for circulating the synthesis gas breaks down. This risk does not arise when naturally circulating water is used for cooling, as proposed by the present invention.

The invention will be hereinafter illustratively described with reference to the drawings. FIG. 1 is a cooling system comprising a collection vessel, FIG. 2 a system comprising cooling means in the space between the shell and the catalyst vessel.

The high-pressure reactor (FIG. 1) comprises a pressure-resistant outer shell 1, a catalyst vessel 2 inside said shell and a heat exchanger 3 mounted on the top of the shell. The synthesis gas enters the heat exchanger 3 through a connection 4 and after having passed through the exchanger flows through the following catalyst beds 5 in the interior of the catalyst vessel 2. The synthesis gas leaves the reactor through a second connection 7 after having passed through a central pipe 6 on the gas outlet side of the catalyst vessel 2 and thence through the tubes of the heat exchanger 3. Owing to the pressure loss caused by friction as the gas passes through the reactor the pressure at the gas outlet connection 7 is less than that at any preceding point of its path whilst the gas is in motion.

For cooling the pressure-resistant shell 1 the space 15 between the shell 1 and the catalyst vessel 2 is filled with water. At the top this space communicates through a pipe 8 and at the bottom through a pipe 9 with a collection vessel 10. The pipe lines 8 and 9 are completely filled with water, whereas the collection vessel 10 is only about two-thirds full. For equalizing the pressures inside the reactor and in the space surrounding the catalyst vessel 2 a connecting pipe 17 is provided between the exit connection 7 from the high-pressure reactor and the top of the collection vessel 10. Hence the pressure existing at the outlet connection 7 is transmitted to the water cooling system and to the space between the shell 1 and the catalyst vessel 2. When the gas flows, the pressure in the outlet 7 is the minimum pressure. Consequently the pressure in the space between the shell 1 and the catalyst vessel 2 will also be lower than that obtaining inside the catalyst vessel.

So long as gas flows the wall of the catalyst vessel 2 will therefore always be stressed by an internal pressure. When the gas ceases to flow the inside pressure will be equal to the outside pressure and the wall of the catalyst vessel 2 will then not be stressed at all.

The collection vessel 10 contains a cooling pipe coil 12 for cooling the water. The cooling effect is controlled by a valve 18. The shell 1 is cooled because the heat transferred to the water through the wall of the catalyst vessel 2 raises the temperature of the water to a level determined by the controllable temperaure of the water in the collection vessel 10. The buoyancy of the hot water in the high pressure reactor and the downward movement of the water that has been cooled in the collection vessel 10 together generate natural circulation of the water through the cooling system.

FIGURE 2 illustrates another embodiment of the cooling system.

In this embodiment the space between the shell 1 and the catalyst vessel 2 is only partly filled with water. The space is divided by a central cylindrical partition 13 into two annular chambers. The annular chamber between the cylindrical partition 13 and the shell 1 contains a cooling pipe coil 12. For the purpose of equalizing the pressures a connecting pipe 14 is provided between the reactor outlet at 7 and the top of the space (connection 11) between the catalyst vessel 2 and the shell 1.

Natural circulation of water through the space between the shell 1 and the catalyst vessel 2 is caused by the fact that the water which in the inner annular chamber is heated through the wall of the catalyst vessel 2 rises, whereas the water in the outer annular chamber descends because of the cooling effect of the cooling pipe coil. In order to maintain this circulation of cooling water, the top of the cylindrical partition 13 in the intervening space 15 between the shell 1 and the catalyst vessel 2 must be below the level of the water.

I claim:

1. A high pressure reactor having a cooling system comprising a vertical, cylindrical catalyst vessel, means for admitting gas to said vessel, and means for discharging gas from said vessel, a shell surrounding said vessel with an annular space therebetween, a second vessel, pipe means for circulating cooling water from said second vessel to the bottom of said annular space and from the top of said annular space back to said second vessel, means for cooling the water circulated therethrough, and pressure-equalizing pipe means connecting the top of said second vessel and the gas exit portion of said catalyst vessel.

2. A high pressure reactor as claimed in claim 1 wherein said annular space is filled with circulating cooling water, said second vessel being partly filled with said circulating cooling water, and said means for cooling the circulating water being a heat exchanger in said second vessel.

References Cited
UNITED STATES PATENTS
1,286,135  11/1918  Somermeier _____ 23—289

ROBERT A. O'LEARY, Primary Examiner
C. SUKALO, Assistant Examiner

U.S. Cl. X.R.
23—289; 165—169